Jan. 16, 1968  R. A. LARSON  3,363,937
FASTENING DEVICE FOR A HINGED MEMBER
Filed April 27, 1965  3 Sheets-Sheet 1

ROGER A. LARSON
INVENTOR

Huebner & Worrel
ATTORNEYS

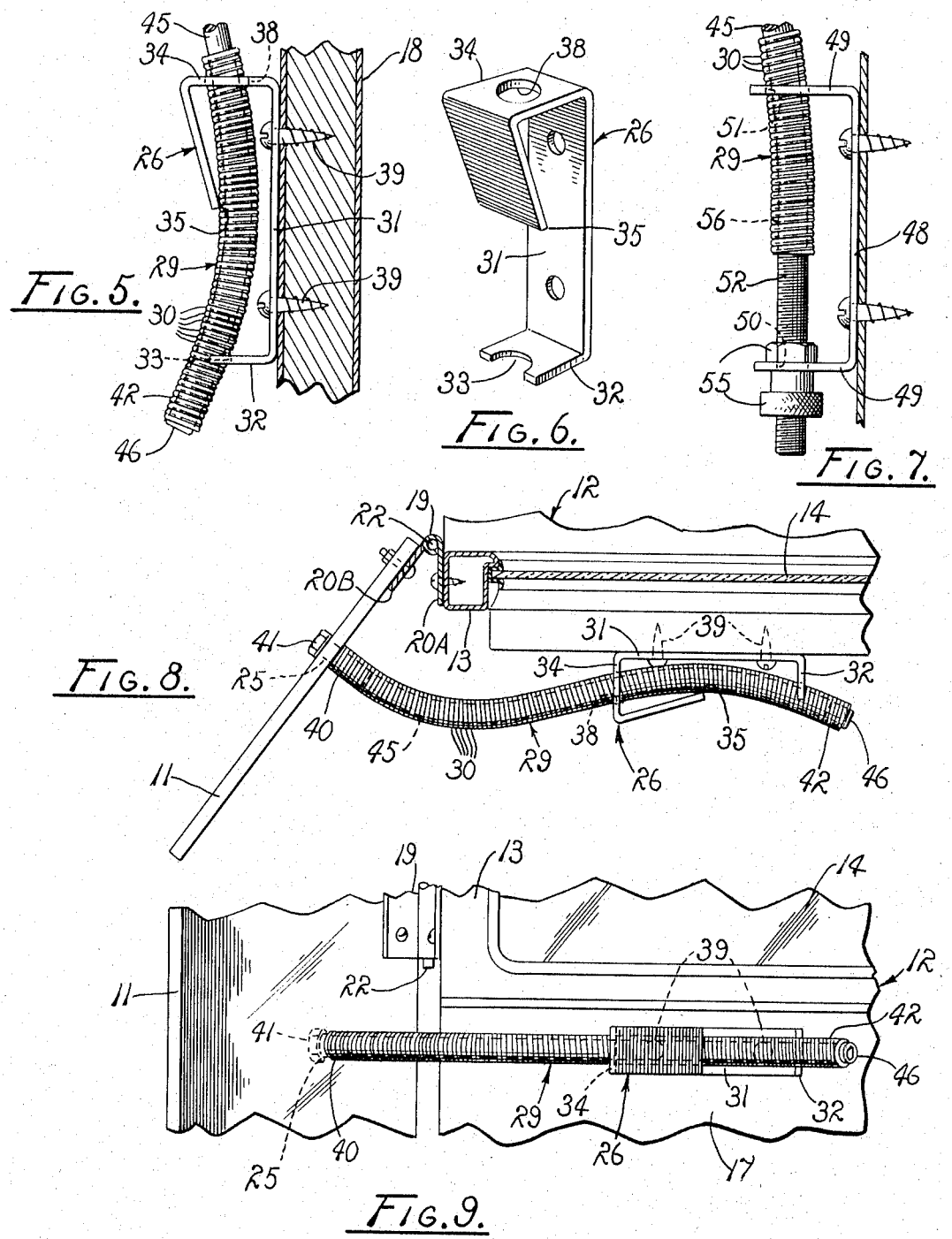

Jan. 16, 1968  R. A. LARSON  3,363,937
FASTENING DEVICE FOR A HINGED MEMBER
Filed April 27, 1965  3 Sheets-Sheet 3

ROGER A. LARSON
INVENTOR

Huebner & Worrel
ATTORNEYS

United States Patent Office

3,363,937
Patented Jan. 16, 1968

3,363,937
FASTENING DEVICE FOR A HINGED MEMBER
Roger A. Larson, 1716 Burton Way,
Bakersfield, Calif. 93305
Filed Apr. 27, 1965, Ser. No. 451,210
8 Claims. (Cl. 296—84)

ABSTRACT OF THE DISCLOSURE

A hinge device comprising rotatably interconnected hinge plates, which preferably are selectively separable, and respectively having retaining elements thereon, between which is interconnected a resiliently flexible member extending substantially coextensively with the length of and between the plates, and having end portions thereof respectively operatively associated with the retaining elements and being coactable therewith, whereby one plate may be angularly disposed or positioned with respect to the other of the plates, and wherein the resiliently flexible member serves to angularly orient one of the plates with respect to the other, while rendering one plate resiliently yieldable with respect to the other plate upon impact forces being applied thereagainst.

---

The present invention relates to a fastening device for a hinged member and more particularly to such a device adapted to be used with a first member hingedly associated with a second member and which allows the adjustable fastening of the first member in selected positions of hinged orientation relative to the second member.

Background

The device of the present invention is adapted to be used with many types of hinged members which may be conveniently and effectively fastened in selected positions of orientation relative to a second member. For example, it is frequently desirable to adjust the positions of doors, gates, air-conditioning and/or ventilating louvers, ventilating windows and so forth. It is also adapted for use with wind deflectors and glare shields mounted on vehicles for the convenience and comfort of occupants thereof. For convenience of description, the present invention is described in connection with a vehicle as an illustrative operational environment, and more particularly in connection with a land vehicle of the utility or cross-country type, for which the device of the subject invention is especially suitable.

Vehicles frequently have open sides affording occupants no protection from wind draughts athwart the vehicle during highway travel. Side flaps have been secured to vehicle windshields to provide such protection but these have previously been mounted by means of typical hinges and restraining brackets which hold the flaps in rigid connection to the vehicle. During field use, when the vehicle is driven cross country through forests or growths of brush and thick foliage, the flaps are subjected to damage through contact with branches and the like. Quite frequently, the forceful impact of such contact is sufficient to rupture the hinges or brackets thereby causing complete fracture or separation of the flaps from the vehicle. Although such flaps have sometimes been made removable to allow unobstructed passage through forests and the like, it has previously been necessary to utilize tools for this purpose in order to unseat connecting screws and the like to allow separation of the hinges and brackets. The obvious inconvenience of such usage tends to deter the operator from taking the trouble to remove such flaps, thereby inviting costly damage.

In the case of vehicles with doors, the problem arises of damaging contact between a side flap and a door or other parts of the vehicle. Although all of the above problems may be susceptible of solution through use of some type of resilient mounting, the problems still remain of insuring adequate wind deflection for all speeds of the vehicle and of allowing adjustable positioning of the flaps in selected positions of laterally outward extension from the vehicle.

During the operation of vehicles it is also frequently desirable to utilize a shield for blocking sun glare. Such shields are of well-known utility and have previously been made adjustable through effective use of frictional bearing surfaces. However, when used in a vehicle without a top, such shields are often buffeted by wind blasts which overcome the frictional resistance of their mountings and force the shields out of position. This disadvantage also limits the potential utility of such a shield, which, if effectively fastened in a selected position, can also serve as an auxiliary wind deflector to shield the vehicle occupants from frontal wind blast.

Summary

The present invention provides a hinge device including rotatably interconnected hinge plates. A resiliently flexible member consisting of a spiral spring having stiffening portions in lengths thereof interconnects the hinge plates, and means are provided on the hinge plates for coacting with the spring to serve as a restraining and positioning member for and between the hinge plates. The resiliently flexible member is operable to angularly orient one of the plates with respect to the other, while rendering the plates resiliently movable or yieldable with respect to one another upon impact forces being applied to a windshield or the like, secured to one of the plates. An additional feature of the invention consists in the interconnecting means between the hinge plates being easily removable so that members such as wind deflectors or windshields, interconnected by means of the present hinge device can be selectively and quickly moved to such a position as not to be subjected to contact with obstructions which might exist in terrain over which a vehicle is traveling.

Therefore, it is an object of the present invention to provide an improved fastening device for a hinged member.

Another object is to provide such a device for fastening a wind deflector on a vehicle to shield occupants thereof from wind draughts.

Another object is to provide such a device for fastening a hinged sun-glare shield on a vehicle.

Another object is to provide such a device which allows a hinged element or member to be adjustably positionable in selected positions of hinged orientation relative to a second element or member.

Another object is to provide such a device for fastening a hinged member to a base element so that the hinged member is adapted resiliently to yield upon contact with solid objects or surfaces.

Another object is to provide such a device which maintains the hinged member in a steady position while experiencing vibrations, wind gusts and the like.

Another object is to provide such a device which allows the convenient removal of the hinged member from its hinged mounting without the use of tools.

Another object is to provide such a device which allows the fastening of a hinged element firmly in said positions of hinged orientation while allowing ready and convenient changing of said positions.

Another object is to provide such a device which is not prone to break upon contact with surrounding objects or with the vehicle.

Another object is to provide such a device which may be used on a vehicle either with or without a door.

Another object is to provide such a device for fastening a wind deflector mounted on a vehicle having a door so as to avoid contact between the deflector and either the vehicle or the door during opening of the door.

Another object is to provide a wind deflector for a vehicle which may be adjustably positionable in selected positions of laterally outward extension from the vehicle to shield occupants of the vehicle from wind while resiliently yielding upon contact with solid objects.

Another object is to provide such a wind deflector which is adapted to be operably associated with said fastening device.

These and other objects will become more readily apparent upon reference to the following description and accompanying drawings.

In the drawings:

FIG. 5 is a side view of a form of detent bracket embodying the principles of the present invention.

FIG. 6 is a perspective view of the detent bracket of FIG. 5.

FIG. 7 is a side view of a second form of detent bracket adapted to be used in devices embodying the present invention.

FIG. 8 is a further enlarged horizontal section of the vehicle of FIG. 1 showing the device of FIG. 3 with the detent bracket mounted on the vehicle dashboard.

FIG. 9 is a side view of the device shown in FIG. 8.

Figure 1:
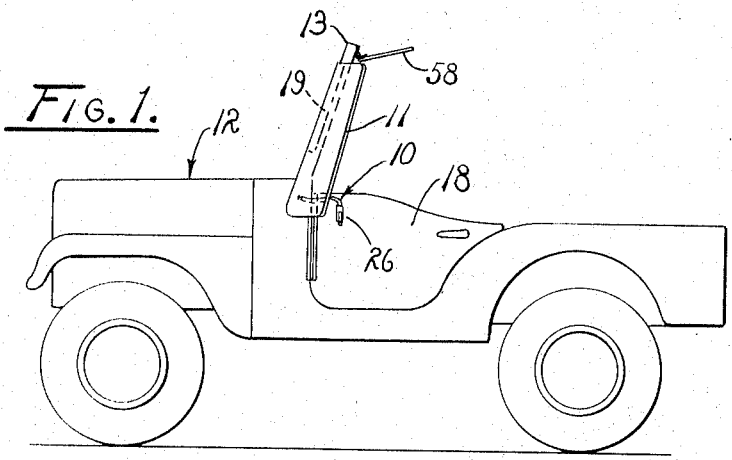
FIG. 1 is a side elevation of a vehicle on which are mounted two structural forms of a device embodying the principles of the present invention.
Figure 2:
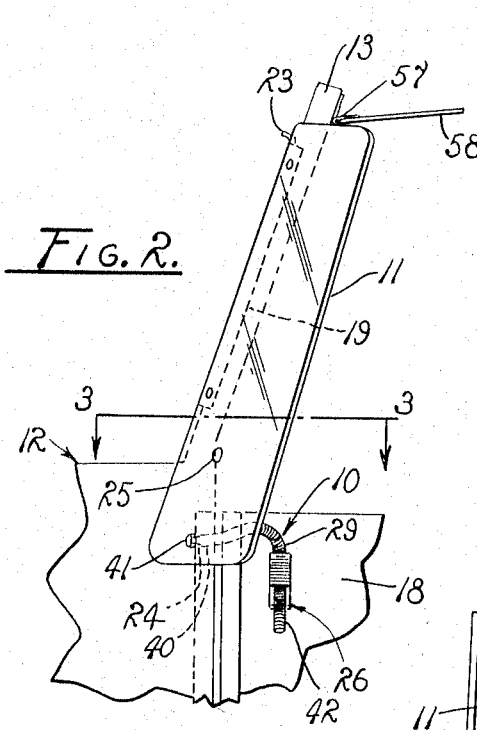
FIG. 2 is a somewhat enlarged fragmentary side elevation of the vehicle of FIG. 1.

Referring more particularly to the drawings, one form of the present invention is shown generally at 10 in operable association with a flap 11 mounted on a vehicle 12 so as to provide a wind deflector for occupants thereof. The vehicle has a windshield frame 13 supporting a main windshield 14 above a dashboard 17. A hinged door 18 is mounted on the vehicle. The flap is mounted on the vehicle by means of a hinge 19, preferably of a type known as a piano hinge. The hinge consists of two hinged plates 20A and 20B hingedly connected by a removable hinge pin 22. One end 23 of the pin is angled or otherwise adapted to provide convenient purchased thereon for the purpose of removal. One hinge plate 20A is bolted to the windshield frame, while the other hinge plate 20B is bolted to the flap. The flap is formed preferably of a resiliently flexible transparent material such as a suitable plastic or plexiglass. Holes 24 and 25 are provided in the flap for selective utilization, as will be described.

A detent bracket 26 is mounted conveniently on the vehicle 12, such as by attachment to the door 18 and is adapted to grip or secure an elongated retaining member such as a coil spring 29, to be described. The bracket may take any of several forms; however, in its preferred form it consists of an elongated plate, preferably of a suitable rigid material, having a base surface 31, a projecting ear 32 at one end of the plate providing an arcuate saddle 33, and a perforated arm 34 at the other end. The arm 34 is angled towards the base surface to provide a gripping edge 35 adjacent thereto. The perforated arm provides an opening or a hole 38 adapted to accommodate the spring, preferably in snugly slidable engagement therein. The bracket is secured to the door in any suitable manner, as by means of bolts 39, releasable vacuum cups, not shown, or the like.

The retaining spring 29, formed preferably of stiffly resilient coils, connects the flap 11 to the detent bracket 26 in operable association therewith. One end 40 of the spring is secured to the flap, preferably by means of a threaded bolt 41 extending through the hole 24, which is conveniently at a level with the door-mounted bracket. The other end 42 of the spring remains free for selective positioning in the bracket. The threads of the bolt serve to grip the spring coils 30 in secure engagement. Other suitable connections, preferably of a releasable type, may be utilized for this purpose. A damping element, such as a cylindrical rubber strip 45 is preferably disposed within the spring and secured therein by means of a second bolt 46, if desired.

In its connective association with the bracket 26, the free end 42 of the spring 29 is slid through the hole 38 and extended between the base surface 31 and the gripping edge 35 to the saddle 33 where it is seated in flexed relation thereon. The projecting saddle, in its offset position relative to the gripping edge and the hole 38, serves to maintain the coils 30 of the spring in secure engagement with the gripping edge.

For use on vehicles 12 either with or without a door, the bracket 26 may also be secured to the dashboard 17 of the vehicle, in any suitable manner, as shown in FIGS. 8 and 9. For such mounting, the coil spring 29 is bolted to the flap 11 at the hole 25, which, in this case, is conveniently disposed at an approximate level with the dashboard-mounted detent bracket.

By flexing the spring 29 and sliding it through the detent bracket 26 the flap 11 is swung in and out through a range of positions laterally outwardly extended from the vehicle 12. It is conveniently secured in any desired position by again seating the spring on the saddle 33. The spring is of a suitable length and stiffness to hold the flap against the force of wind gusts and the like, while yielding readily upon contact with solid objects. The damping element 45 serves to minimize chattering or vibration of the flap during operation of the vehicle. Similarly, for use in other environments the retaining spring is adapted to hold a flap, door, window, louver or the like, not shown, in selected positions of orientation without disturbance by air gusts or other external interferences.

Figure 3:
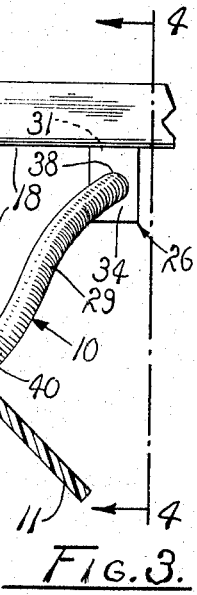
FIG. 3 is a further enlarged horizontal section of one structural form of the present invention taken in a plane represented by line 3—3 in FIG. 2, and showing the device in respective positions with the vehicle door open and closed.
Figure 4:
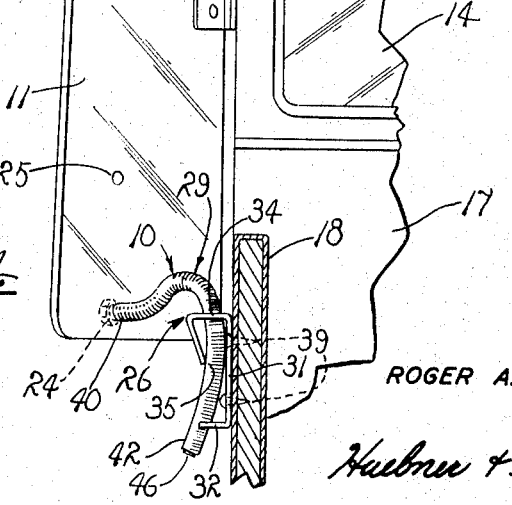
FIG. 4 is a somewhat diminished fragmentary end section of the vehicle of FIG. 3 taken in a plane represented by line 4—4 thereof.
Figure 10:
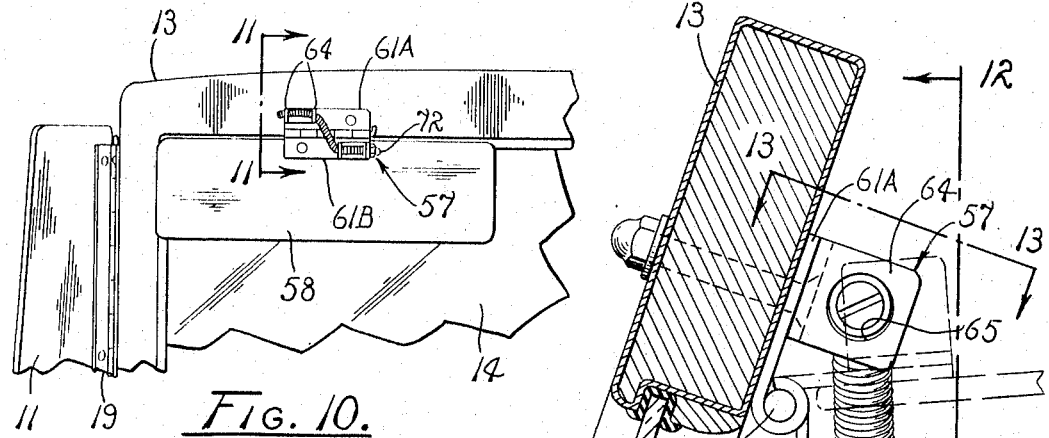
FIG. 10 is a fragmentary enlarged end view of the vehicle of FIG. 1 showing a second form of device embodying the principles of the present invention, in operable association with a sun-glare shield.
Figure 11:
FIG. 11 is a further enlarged end view of the device shown in FIG. 10 taken in a plane represented by line 11—11 therein and showing the sun-glare shield in upward and downward positions respectively.

The length and orientation of the retaining spring 29, in its operable association with the flap 11 and detent bracket 26, must be such as to maintain the spring in a continuously curved or flexed configuration so as to prevent the spring from functioning as a compression member and thus converting the device 10 into a rigid non-yielding structure. When the vehicle 12 has a door 18 and the detent bracket is mounted thereon as described above, opening of the door causes the retaining spring flexibly to reorient itself while the flap swings automatically away from its normal position, as shown in FIG. 3. In this manner, the flap avoids contact with the door as well as with any other portion of the vehicle. Upon closing the door, the flap automatically assumes its original position.

A second type of detent bracket is shown in FIG. 7. It consists of a base 48 and projecting ears 49. The ears are perforated to provide openings or holes 50 and 51. Hole 50 is adapted to accommodate a threaded detent or locking bolt 52. Hole 51 is adapted to accommodate the retaining spring 29. The hole for the spring is at a greater distance from the base than is the hole for the bolt so that the spring is flexed outwardly, as shown in FIG. 7, and is thereby caused to assume an arcuate configuration precluding its functioning as a column, for the reasons mentioned above. The bolt is adjustably secured in its hold in any suitable manner, as by means of nuts 55 or the like, and is disposed with its threads 56 in secure adjustable engagement within the coil spring. The bracket may be bolted to the door 18 or the dashboard 17 as described above for the bracket 26.

Second form

A second form of the present invention provides a self-locking hinge device shown generally at 57 as being mounted on the vehicle 12 in operable association with a sun-glare shield 58. The second form consists of a typical hinge assembly including a pair of hinge plates 61A and 61B hingedly connected by an elongated hinge pin 62. The hinge pin provides a gripping portion or angled extension 63 at one end to allow its convenient removal for separation of the hinge plates. One plate 61A is bolted to the windshield frame 13 and the other plate 61B is bolted to the shield 58. The shield is formed preferably of a tinted plastic material and is adapted to serve as a sun shade. The shield may assume any of several shapes as necessary.

A pair of spaced ears 64 is mounted at one end of hinge plate 61A, by welding or the like. The ears provide aligned openings or holes 65 and 66 adapted to accommodate an elongated retaining member 68. A second pair of spaced ears 69 is mounted at the opposite end of hinge plate 61B. These ears provide openings or holes 70 and 71 adapted to accommodate the retaining member and a threaded bolt 72, respectively. The retaining member is disposed through holes 65, 66 and 70 and consists preferably of a stiffly flexible coil spring. A damping or stiffening element 75 is preferably disposed within the spring and is formed of any suitable material such as a hard rubber. The bolt 72 extends through the hole 71 and into the spring so that its threads are adjustably engaged with the coils of the spring.

Figure 13:
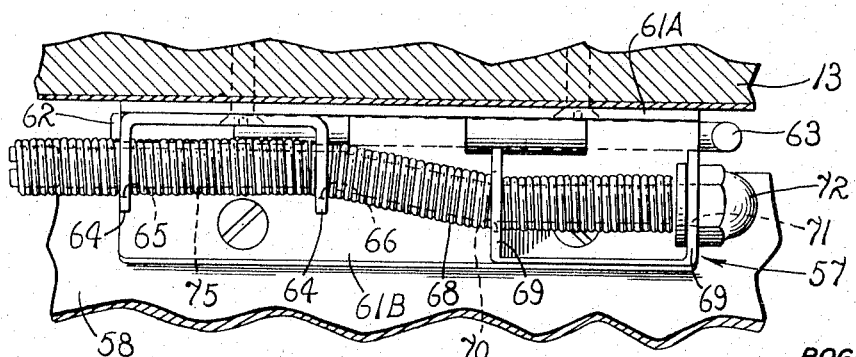
FIG. 13 is a top view of the device of FIG. 11 showing the sun-glare shield in an upward position.

The holes 65, 66, 70 and 71 are so disposed in their respective ears 64 and 69 that when the hinge plates 61 are swung or folded together to contact the opposite ears, as shown in FIG. 13, the spring 68 is maintained in a flexed, biased condition and thus serves at all times to prevent chattering or rattling of the device. Obviously, the pairs of ears may be reversed on the hinge plates without affecting the scope and utility of the present invention.

When the hinge plates 61 are folded together, as shown in FIG. 13, the shield 58 is disposed in an upward position as shown in FIG. 1. In this position the shield serves as a wind deflector for protecting occupants of the vehicle 12 from frontal wind blasts. Due to the secure engagement of the spring 68 with the ears 64 and 69, the shield is effectively locked in a firm position against the force of the wind. The stiffness of the spring enhances this firmness while allowing selective adjustment at any time to re-position the shield for blocking sun glare from the occupants.

Figure 12:
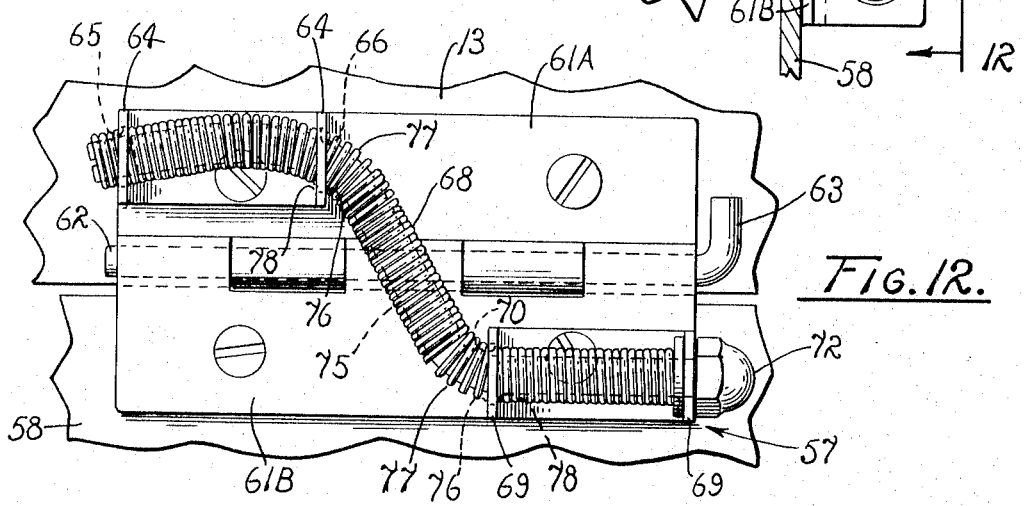
FIG. 12 is a side view of the device shown in FIG. 10 taken in a plane represented by line 12—12 therein.

With the hinge device in its expanded open position, as shown in FIG. 12, the shield is adapted to be used for the shielding of sun glare from occupants. In this position the spring 68 is flexed into gripping contact with the inner edges 76 of the respective holes 66 and 70. At the same time, the outer portions 77 of the flexed coils are spread apart to allow more effective gripping purchase by the outer edges 78 of the respective holes 66 and 70. To a lesser degree, the spring is also engaged in hole 65. The opposing forces acting on the spring serve as a form of coupling device to distort the spring and cause it resiliently to react in opposition. This forceful reaction by the spring cooperates with the opposed coupling forces to cause the coiled surfaces of the spring forcefully to engage the ears and thereby lock the hinge plates 61 in selected positions of orientation relative to each other.

The above described wind deflector 11 and sun shield 58 may be mounted respectively on either side or on both sides of the vehicle 12, as desired. By removing the respective hinge pins 22 and 62, which is accomplished readily by exerting a slight longitudinal pull thereon, either the deflector or the shield can be removed entirely from the vehicle when desired.

Although in all forms of the present invention any suitable type of a resiliently flexible spring may be utilized as the retaining member, it is preferable to use a stiffly flexible spring formed of a galvanized spring-steel material effective in resisting abrasion and corrosion. Further, by utilizing a non-breakable material for the side flap 11, the danger of breakage during cross-country travel is decreased, although it would be preferable to remove the flap entirely if such danger is substantial.

From the foregoing, it is readily apparent that a device has been provided which utilizes opposed retaining surfaces or edges for gripping a resiliently flexible member in selected positions therebetween. By properly disposing the member in relation to a hinged element and connecting it thereto, the member in cooperation with the retaining edges serves to maintain the hinged element in selected positions of orientation and to withstand external forces such as wind gusts while at the same time allowing the element resiliently to yield to solid objects. The device is adapted to be used with any type of hinged element and may be conveniently and readily adjusted in order to change the positions of the element.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device comprising first element, a second element, means defining a hinge axis associating said second element for relative hinged movement about the hinge axis with respect to said first element in selected positions of resiliently fixed orientation relative to (a) said second element, means defining an elongated resiliently flexible member interposed longitudinally and substantially coextensively between said first and second elements and having first and second opposite end portions respectively, said second end portion providing detent engaging means; means for operably associating said first end portion with the first element for movement substantially integrally therewith; detent means; and means for operably associating said detent means with said second element and adapted to engage said detent engaging means, said second end portion of the flexible member being adjustably positionable to dispose its detent engaging means in selected positions of engagement with the detent means when said first element is secured to the second element in the association defined.

2. A self-locking hinge device comprising first and second elongated hinge plates each having respective first and second opposite end portions, edges and sides; means connecting said plates in edgeways longitudinally coextensive hinged relation with their respective first and second sides and end portions correspondingly matched; at least two ears projecting from a first end portion of the first plate in spaced relation along the first side thereof, said ears being integrally associated with said plate, said ears each providing an aperture disposed in substantial registry with the other aperture, one of said ears being disposed adjacently of the end of said plate and the other ear being disposed longitudinally inwardly thereof; at least two ears projecting from the second end portion of the second plate in spaced relation along the first side thereof, said ears each providing an aperture disposed in substantial registry with the other aperture; an elongated resiliently flexible coil spring having first and second opposite end portions, said first end portion being disposed through the aperture of at least the inward of the ears projecting from the first plate and in slidable engagement therewith, said second end portion being disposed through the apertures of the ears projecting from the second plate and in slidable engagement with said ears; and means securing the first end portion of the spring to the ear disposed adjacently of the end of the first plate, said plates being adapted to be moved in hinged relationship to each other while the spring flexes resiliently and the second end portion thereof assumes successive positions of resilient engagement with the ears projecting from the second plate, the coils of said spring being adapted resiliently to engage said ears and releasably to hold the plates in selective relative positions corresponding to the successive engaged positions of said spring.

3. A device for fastening a shield for passengers of a vehicle having a windshield member disposed transversely of the vehicle, said shield being mounted on the windshield member for hinged movement thereon, comprising an elongated resiliently flexible coil spring retaining member having first and second opposite end portions; means operably associating said first end portion with the shield for integral movement therewith; means for gripping the second end portion of the retaining member at selected positions therealong; and means for operably associating the gripping means with the windshield member to dispose said gripping means for gripping the second end portion in said selected positions, said shield when mounted in the defined association being selectively positionable throughout a range of positions relative to passengers to provide a shield for said passengers.

4. A wind deflector for a vehicle adapted to move in a predetermined direction and having a front, opposite sides, and a windshield member disposed transversely of the vehicle, comprising a flap of resilient transparent material; a hinge for connecting the flap to the windshield member laterally of the vehicle, said flap being adapted to swing on said hinge respectively substantially toward and away from said direction of movement; an elongated resiliently flexible coil spring having first and second opposite end portions, said first end portion being secured to the flap; and a detent bracket adapted to be mounted on the vehicle comprising a base, a gripping edge disposed in spaced facing relation to said base, said spring being disposable between the gripping edge and the base with the second end portion projecting therefrom, said bracket also having a second edge disposed in offset relation to said base and releasably engageable with said second end portion to urge said spring into secure engagement with the gripping edge, said spring being removable from said bracket upon release of the spring from the second edge, said spring being selectively positionable in the detent bracket to dispose the flap in selected positions of laterally outward extension from the vehicle, said flap being adapted resiliently to yield to external forces so as to avoid destructive contact between the flap and surrounding objects.

5. The wind deflector of claim 4 wherein the vehicle includes a door having an outside surface, the detent bracket being mounted on said outside surface; and wherein the spring is arcuately disposed between the flap and the detent bracket so as to allow said spring resiliently to yield during movement of the door and thereby to avoid contact between the flap and the vehicle during movement of the door.

6. In combination with a wind deflector hingedly mounted at the side of a vehicle, a device for fastening said deflector in selected positions of outward orientation relative to the vehicle comprising an elongated resiliently flexible retaining member having first and second opposite end portions, said first end portion being secured to the deflector; detent means connectable to the vehicle, said detent means being adapted adjustably to secure said second end portion so as to dispose the deflector in selected positions of laterally outward extension from the vehicle, said retaining member being a coil spring, said detent means comprising an elongated detent bolt having a threaded end, and a detent bracket having first and second spaced ears providing first and second aligned openings respectively, said second opening being adapted to accommodate the second end portion of the spring in sliding engagement therein, said detent bolt being disposed in said first opening with said threaded end secured in adjustable threaded engagement with the second end portion of said spring, said second end portion being disposed through the second opening; and means adjustably securing the bolt throughout a range of selected positions in said first opening, said spring being positionable throughout a range of selected positions in the detent bracket by adjustment of the bolt securing means and of the threaded engagement of the spring with said threaded end of the bolt.

7. A hinge comprising a pair of hinge plates, means rotatably interconnecting said hinge plates, said interconnecting means being removable for disconnecting one said hinge plates from the other, a resiliently flexible member interconnected between said plates and being confined therebetween and substantially longitudinally coextensive with said plates, one end portion on said flexible member connected to one of said plates, said flexible member connected to the other of said plates along its length, whereby one plate may be angularly disposed with respect to the other of said plates, said flexible member being operable to fixedly angularly orient one of the plates with respect to the other, while rendering one plate resiliently yieldable with respect to the other of said plates upon impact forces being applied thereagainst.

8. A hinge as claimed in claim 7 wherein said resiliently flexible member comprises a coil spring, and wherein detent means are provided for operably engaging in and between successive coils of said spring for positive but resilient positioning thereof and the plates interconnected thereby, said detent means comprising a bracket, said bracket having an upper circular opening through which an end of said coil spring is passed in frictional engagement therewith, and a lower notch engaging said coil spring in frictional restrictive engagement therewith, coaction between the resiliently restricting or engaging means at the upper and lower ends of said spring operable to positively and resiliently position said spring to restrict relative angular disposition of one said plate with respect to the other of said plates.

References Cited
UNITED STATES PATENTS

| | | | |
|---|---|---|---|
| 1,821,282 | 9/1931 | Wall | 296—84 |
| 2,034,905 | 3/1936 | Jacobs. | |
| 2,568,225 | 9/1951 | Doman | 16—191 X |
| 2,577,456 | 12/1951 | Doman | 16—142 |

BENJAMIN HERSH, *Primary Examiner.*

MILTON BUCHLER, *Examiner.*

J. A. PEKAR, *Assistant Examiner.*